(12) United States Patent
Kuo et al.

(10) Patent No.: US 9,798,118 B2
(45) Date of Patent: Oct. 24, 2017

(54) PROJECTION DISPLAY APPARATUS AND PROJECTION LENS MODULE THEREOF

(71) Applicant: Coretronic Corporation, Hsin-Chu (TW)

(72) Inventors: Tao-Hung Kuo, Hsin-Chu (TW); Yi-Chin Chen, Hsin-Chu (TW); Ching-Chuan Wei, Hsin-Chu (TW); Chuan-Te Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/170,825

(22) Filed: Jun. 1, 2016

(65) Prior Publication Data

US 2017/0038564 A1  Feb. 9, 2017

(30) Foreign Application Priority Data

Aug. 4, 2015  (TW) .............................. 104125298 A (51) Int. Cl.
*G02B 13/16* (2006.01)
*H04N 9/31* (2006.01)
(Continued)

(52) U.S. Cl.
CPC ............. *G02B 13/16* (2013.01); *G02B 5/04* (2013.01); *G02B 9/60* (2013.01); *G02B 9/62* (2013.01); *G02B 13/04* (2013.01); *G02B 13/18* (2013.01); *G03B 21/142* (2013.01); *H04N 9/3102* (2013.01); *H04N 9/315* (2013.01); *H04N 9/3197* (2013.01)

(58) Field of Classification Search
CPC ...... G03B 21/28; G03B 21/53; G03B 21/142; G03B 21/147; G03B 21/208; G02B 13/04; G02B 13/16; G02B 13/18
See application file for complete search history.

(56) References Cited

U.S. PATENT DOCUMENTS 7,864,452 B2  1/2011 Ning
2005/0117228 A1  6/2005 Kim
(Continued)

FOREIGN PATENT DOCUMENTS

CN  102937739 A  2/2013
JP  1993045582  2/1993
(Continued)

*Primary Examiner* — Sultan Chowdhury
(74) *Attorney, Agent, or Firm* — Li-Jen Shen (57) ABSTRACT

A projection display apparatus includes a light source module, an optical engine module and a projection lens module. The optical engine module includes a prism and a light valve. The projection lens module includes a first lens group and a second lens group. The first lens group is disposed between the screen end and the imaging end. The first lens group includes a first lens, a second lens and a third lens, which are sequentially disposed from the screen end to the imaging end and have negative, negative and positive refractive powers, respectively. The second lens group is disposed between the first lens group and the imaging end and has a positive refractive power. The second lens group includes a fourth lens, a fifth lens and a sixth lens, which are sequentially disposed from the screen end to the imaging end and have negative, positive and positive refractive powers, respectively.

20 Claims, 11 Drawing Sheets (51) Int. Cl.
*G02B 9/60* (2006.01)
*G02B 13/18* (2006.01)
*G02B 13/04* (2006.01)
*G02B 9/62* (2006.01)
*G02B 5/04* (2006.01)
*G03B 21/14* (2006.01)

(56) References Cited

U.S. PATENT DOCUMENTS

| | | |
|---|---|---|
| 2006/0028739 A1 | 2/2006 | Kreitzer et al. |
| 2006/0028741 A1 | 2/2006 | Kreitzer et al. |
| 2010/0208364 A1* | 8/2010 | Minefuji ............ G02B 17/0816 359/731 |
| 2011/0199692 A1 | 8/2011 | Minefuji |
| 2012/0019926 A1* | 1/2012 | Yamagami ........... G02B 15/177 359/680 |
| 2012/0057249 A1 | 3/2012 | Yamamoto |
| 2014/0043691 A1* | 2/2014 | Tomioka ................ G02B 13/14 359/680 |
| 2015/0346464 A1* | 12/2015 | Imai ....................... G02B 13/22 353/38 |
| 2016/0077319 A1* | 3/2016 | Yatsu .................... G02B 13/16 353/98 |

FOREIGN PATENT DOCUMENTS

| | | |
|---|---|---|
| JP | 2001124988 A | 5/2001 |
| JP | 2002543468 A | 12/2002 |
| JP | 2003156683 A | 5/2003 |
| JP | 2005309058 A | 11/2005 |
| JP | 2006513449 A | 4/2006 |
| JP | 2007114397 A | 5/2007 |
| JP | 2007279384 A | 10/2007 |
| JP | 2009058904 A | 3/2009 |
| JP | 2010079252 A | 4/2010 |
| JP | 2011075633 A | 4/2011 |
| JP | 201258315 A | 3/2012 |
| JP | 2012042697 A | 3/2012 |
| JP | 2012073337 A | 4/2012 |
| TW | 200914979 A | 4/2009 |
| TW | M420738 U1 | 1/2012 |
| TW | 201219825 A | 5/2012 |

* cited by examiner

PROJECTION DISPLAY APPARATUS AND PROJECTION LENS MODULE THEREOF

FIELD OF THE INVENTION

The invention relates to a display apparatus, and more particularly to a projection display apparatus and a projection lens module thereof.

BACKGROUND OF THE INVENTION

With advances in technology, projection apparatus is getting more compact and lightweight in response to the demands from users.

However, when projection lens module does not have a sufficiently-wide angle and image projection is required to perform in a limited space, the projected image may have limited adjustable size and the projected image with a relatively-large size may not have a qualified resolution. Therefore, it is quite important to develop a projection apparatus as well as a projection lens module to overcome the above issues.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One object of the invention is to provide a projection display apparatus capable of projecting a large-size image having a qualified resolution.

Another object of the invention is to provide a projection lens module with some advantages such as having a wide-angle.

Other objects and advantages of the invention can be further illustrated by the technical features broadly embodied and described as follows.

In order to achieve one or a portion of or all of the objects or other objects, the invention provides a projection display apparatus. The projection display apparatus includes a light source module, an optical engine module and a projection lens module. The light source module is configured to provide a light beam. The optical engine module is disposed on a transmission path of the light beam. The optical engine module includes a prism and a light valve. The light valve is configured to convert the light beam emitted from the prism into an image beam. The projection lens module is disposed between a screen end and an imaging end and disposed on a transmission path of the image beam. The projection lens module includes a first lens group and a second lens group. The first lens group is disposed between the screen end and the imaging end. The first lens group includes a first lens, a second lens and a third lens, which are sequentially disposed from the screen end to the imaging end and have negative, negative and positive refractive powers, respectively. The second lens group is disposed between the first lens group and the imaging end and has a positive refractive power. The second lens group includes a fourth lens, a fifth lens and a sixth lens, which are sequentially disposed from the screen end to the imaging end and have negative, positive and positive refractive powers, respectively.

In order to achieve one or a portion of or all of the objects or other objects, the invention further provides a projection lens module. The projection lens module is disposed between a screen end and an imaging end and disposed on a transmission path of an image beam from a light valve. The projection lens module includes a first lens group and a second lens group. The first lens group is disposed between the screen end and the imaging end. The first lens group includes a first lens, a second lens and a third lens, which are sequentially disposed from the screen end to the imaging end and have negative, negative and positive refractive powers, respectively. The second lens group is disposed between the first lens group and the imaging end and has a positive refractive power. The second lens group includes a fourth lens, a fifth lens and a sixth lens, which are sequentially disposed from the screen end to the imaging end and have negative, positive and positive refractive powers, respectively.

In one embodiment, the projection lens module further includes an aperture stop. The aperture stop is disposed between the first lens group and the second lens group. The sixth lens is disposed close to the imaging end. At least one of a first distance and a second distance is adjustable, wherein the first distance: the distance between the first lens group and the aperture stop; the second distance: the distance between the second lens group and the imaging end.

In one embodiment, the fourth lens and the fifth lens corporately form a cemented lens.

In one embodiment, the first lens and the second lens are aspherical lenses; and the third lens, the fourth lens and the fifth lens are spherical lenses.

In one embodiment, a distance between the sixth lens and the light valve is BFL; an effective focal length of the projection lens module is f; and the following equation is satisfied: BFL/f>1.5.

In one embodiment, a total length of the projection lens module is TT; an effective focal length of the projection lens module is f; and the following equation is satisfied: 5.4<TT/f<13.5.

In one embodiment, a distance between the third lens and the fourth lens is D34; a distance between the sixth lens and the prism is D6P; and the following equation is satisfied: 3.5<D34/D6P<5.2. The prism is disposed between the sixth lens and the light valve.

In one embodiment, the first lens group has a negative refractive power.

In one embodiment, the second lens group further includes a seventh lens, which is disposed between the third lens and the fourth lens and has a positive refractive power. The first lens group has a positive refractive power.

In one embodiment, a distance between the third lens and the seventh lens is D37; a distance between the sixth lens and the prism is D6P; and the following equation is satisfied: 2<D37/D6P<5.2. The prism is disposed between the sixth lens and the light valve.

In summary, the projection lens module of the invention is constituted by two lens groups, in which the first lens, the second lens, the third lens, the fourth lens, the fifth lens and the sixth lens are sequentially disposed from a screen end to an imaging end and respectively have negative, negative, positive, negative, positive and positive refractive powers. Therefore, the projection lens module of the invention has a wider angle. Because the distance between the between the first lens group and an aperture stop and/or the distance between the second lens group and the imaging end is adjustable when the projection lens module zooms, the images regardless with large-size or with small-size in the invention are relatively clear and have relatively high resolutions in response to various projection requirements. Since the projection display apparatus and the projection lens module have improved imaging qualities, the projected images with various sizes in the invention are relatively clear and have relatively high resolutions in response to various environmental requirements.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
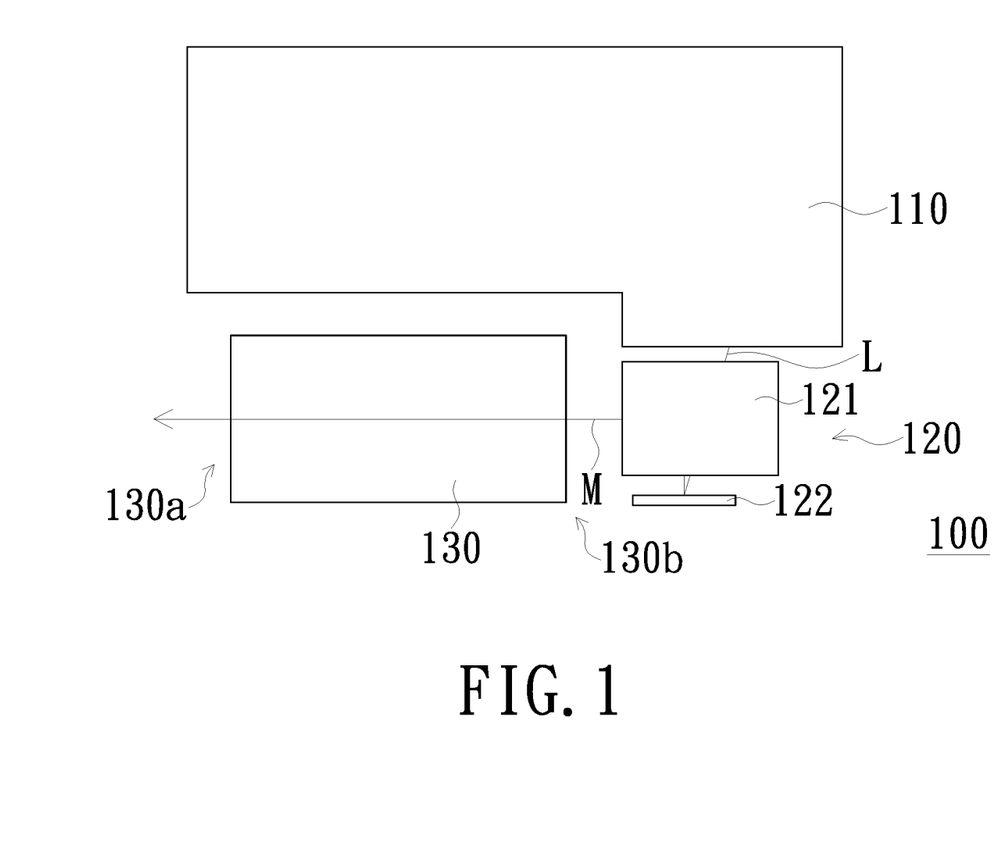
FIG. 1 is a schematic diagram of a projection display apparatus in accordance with an embodiment of the invention.

FIG. 1 is a schematic diagram of a projection display apparatus in accordance with an embodiment of the invention. As shown in FIG. 1, the projection display apparatus 100 of the embodiment includes a light source module 110, an optical engine module 120 and a projection lens module 130. The light source module 110 is configured to provide a light beam L. The optical engine module 120 is disposed on a transmission path of the light beam L. The optical engine module 120 includes a prism 121 and a light valve 122. The prism 121 is disposed on the transmission path of the light beam L. The illustration of the prism 121 in FIG. 1 is for an exemplary purpose only. In one embodiment, the prism 121 may instituted by one or more optical elements and the number and shape of the prism 121 are not limited in the invention. The light valve 122 is configured to convert the light beam L emitted from the prism 121 into an image beam M. The projection lens module 130 is disposed between a screen end 130a and an imaging end 130b and is also disposed on a transmission path of the image beam M. In the embodiment, the screen end 130a is an end relatively far away the optical engine module 120 and the imaging end 130b is an end relatively close to the optical engine module 120. In the embodiment, the light beam L provided by the light source module 110 is projected on the light valve 122 through the optical engine module 120, wherein the light valve 122 is disposed close to the imaging end 130b. Then, the light valve 122 converts the light beam L into the image beam M. Then, the image beam M is sequentially transmitted through the optical engine module 120 and the projection lens module 130, and is eventually projected onto the screen end 130a. In the embodiment, the projection lens module 130 is a fixed lens, but the invention is not so limited.

It is to be noted that the illustration of the projection display apparatus 100 in FIG. 1 is for an exemplary purpose only, and the invention is not limited thereto. For example, in the embodiment, the light valve 122 and the projection lens module 130 are disposed on the two adjacent sides of the prism 121, respectively. In another embodiment, the prism 121 is disposed between the light valve 122 and the projection lens 130 and is also disposed on the transmission path of the image beam M.

Figure 2:
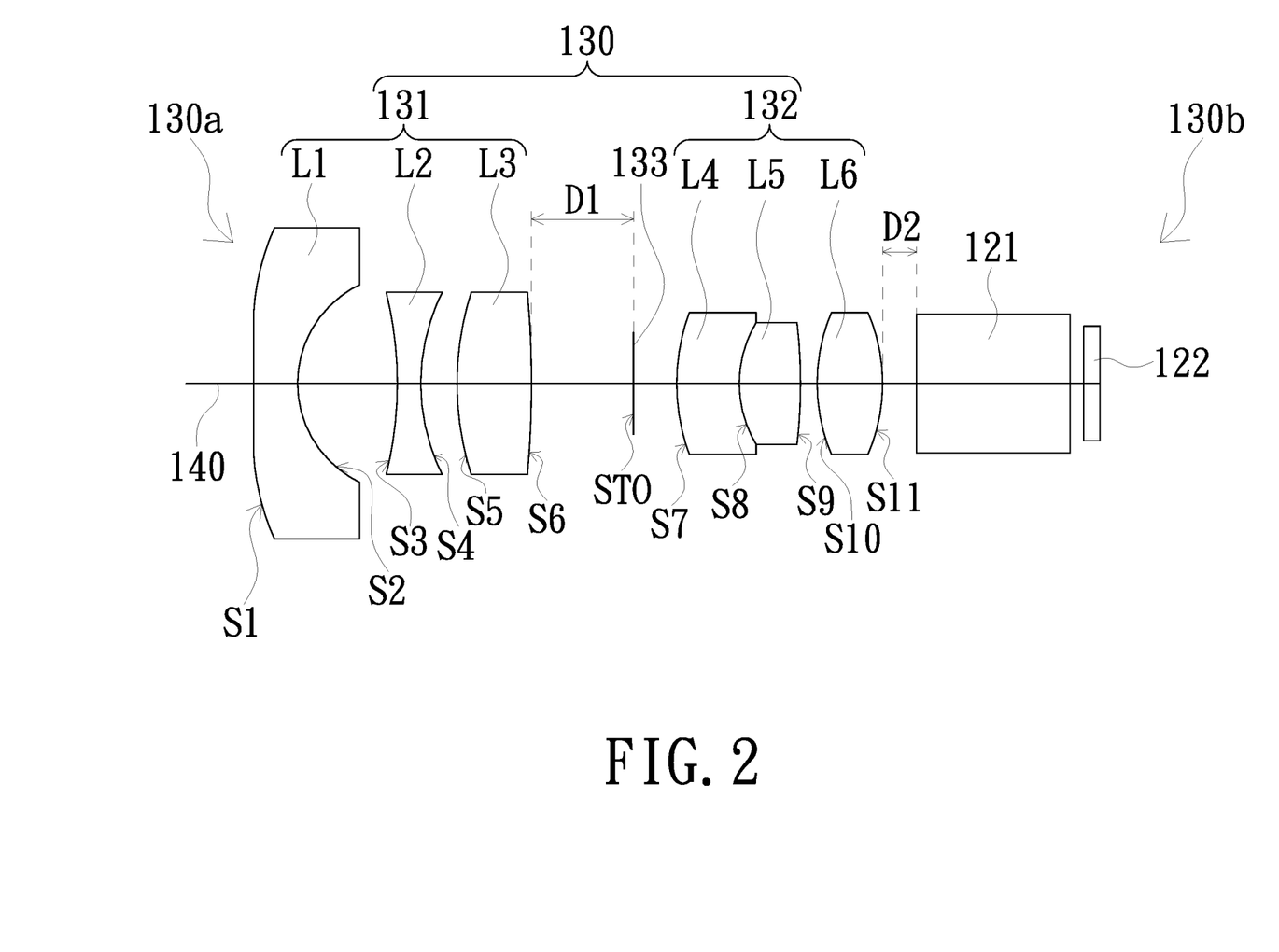
FIG. 2 is a schematic diagram of a projection lens module in accordance with an embodiment of the invention.

FIG. 2 is a schematic diagram of a projection lens module in accordance with an embodiment of the invention. As shown in FIG. 2, the projection lens module 130 of the embodiment includes a first lens group 131 and a second lens group 132. The first lens group 131 and the second lens group 132 are sequentially disposed along an optical axis 140 from the screen end 130a to the imaging end 130b. Specifically, the first lens group 131 is disposed between the screen end 130a and the imaging end 130b; and the second lens group 132 is disposed between the first lens group 131 and the imaging end 130b. In the embodiment, the first lens group 131 has a negative refractive power. The first lens group 131 includes a first lens L1, a second lens L2 and a third lens L3, which are sequentially disposed from the screen end 130a to the imaging end 130b. Specifically, the first lens L1 has a negative refractive power; the second lens L2 has a negative refractive power; and the third lens L3 has a positive refractive power. In the embodiment, the second lens group 132 includes a fourth lens L4, a fifth lens L5 and a sixth lens L6, which are sequentially disposed from the screen end 130a to the imaging end 130b. Specifically, the fourth lens L4 has a negative refractive power; the fifth lens L5 has a positive refractive power; and the sixth lens L6 has a positive refractive power. In the embodiment, the fourth lens L4 is disposed between the third lens L3 and the fifth lens L5; and the sixth lens L6 is disposed close to the imaging end 130b.

In the projection lens module 130 of the embodiment as shown in FIG. 2, the first lens L1 is a convex-concave lens which has a convex surface facing the screen end 130a; the second lens L2 is a concave-concave lens; the third lens L3 is a convex-convex lens; the fourth lens L4 is a convex-concave lens which has a convex surface facing the screen end 130a; the fifth lens L5 is a convex-convex lens; and the sixth lens L6 is a convex-convex lens.

In the embodiment, the prism 121 is disposed between the sixth lens L6 and the light valve 122. The projection lens module 130 further includes an aperture stop 133, which is disposed between the first lens group 131 and the second lens group 132. When the projection lens module 130 of the embodiment zooms, at least one of the flowing two distances D1, D2 is adjustable. Herein the distance D1 is the distance between the first lens group 131 and the aperture stop 133. Specifically, the distance D1 is the distance between the lens (in the first lens group 131 and closest to the imaging end 130b) and the aperture stop 133. More specifically, the distance D1 is the distance between the third lens L3 and the aperture stop 133. The distance D2 is the distance between the second lens group 132 and the prism 121. Specifically, the distance D2 is the distance between the lens (in the second lens group 132 and closest to the imaging end 130b) and the prism 121. More specifically, the distance D2 is the distance between the sixth lens L6 and the prism 121. In the embodiment, the light valve 122, the prism 121 and the optical engine module 120 have fixed positions with respect to each other, thus, the distance between the light valve 122 and the prism 121 is fixed. Therefore, the distance D2 between the second lens group 132 and the prism 121 is equivalent to that the distance between the second lens group 132 and the imaging end 130b is adjustable as well as the distance between the second lens group 132 and the light valve 122 is adjustable. As a result, in one embodiment, the zooming of the projection lens module 130 for adjusting the clarity of a projected image can be achieved through adjusting the distance D1 between the first lens group 131 and the aperture stop 133 and adjusting (or fixing) the distance D2 between the second lens group 132 and the prism 121. In another embodiment, the zooming of the projection lens module 130 for adjusting the clarity of a projected image can be achieved through adjusting the distance D2 between the second lens group 132 and the prism 121 and adjusting (or fixing) the distance D1 between the first lens group 131 and the aperture stop 133.

In the embodiment, the second lens group 132 includes at least one cemented lens. In the embodiment, the cemented lens is corporately formed by the fourth lens L4 and the fifth lens L5, but the invention is not limited thereto.

Please refer to Table I for the related parameters of the projection lens module 130 in accordance with an embodiment of the invention. It is to be noted that these parameters are merely examples, which should not unduly limit the scope of the claims. One of ordinary skill in the art would recognize many variations, alternatives, and modifications.

TABLE I

| Surface | Radius of Curvature (mm) | Distance (mm) | Refractive Index | Abbe number |
|---|---|---|---|---|
| S1 | 190.25 | 3.5 | 1.53 | 55.95 |
| S2 | 5.43 | 7.62 | | |
| S3 | −280.13 | 2.55 | 1.53 | 55.95 |
| S4 | 10.53 | 3.03 | | |
| S5 | 22.13 | 5 | 1.8 | 25.43 |
| S6 | −37.52 | 8 | | |
| STO | Infinity | 3.2 | | |
| S7 | 19.85 | 5 | 1.8 | 25.43 |
| S8 | 8.48 | 4.2 | 1.49 | 70.24 |
| S9 | −29.78 | 1.5 | | |
| S10 | 16.39 | 5 | 1.73 | 28.46 |
| S11 | −11.45 | 3 | | |

In Table 1, surfaces S1, S2 are the two surfaces of the first lens L1; surface S3, S4 are the two surfaces of the second lens L2; surface S5, S6 are the two surfaces of the third lens L3; surface STO is the aperture stop; the fourth lens L4 and the fifth lens L5 corporately form a cemented lens, surface S8 is a surface where the fourth lens L4 and the fifth lens L5 are cemented with each other, surface S7 is another surface of the fourth lens L4, and surface S9 is another surface of the fifth lens L5; and surface S10, S11 are the two surfaces of the sixth lens L6. The distance in Table 1 is referred to a linear distance between two adjacent surfaces on the optical axis 140. For example, the distance of surface S1 is referred to the linear distance between the surfaces S1, S2 of the first lens L1 on the optical axis 140, and so forth.

In the embodiment, the first lens group 131 includes at least one aspherical lens. For example, the first lens L1 and the second lens L2 are aspherical lenses and the third lens L3 is a spherical lens, but the invention is not limited thereto. In the embodiment, the second lens group 132 includes at least one aspherical lens. For example, the fourth lens L4 and the fifth lens L5 are spherical lenses and the sixth lens L6 is an aspherical lens, but the invention is not limited thereto. In the projection lens module 130 of the embodiment, the shapes of the surfaces S1, S2 of the first lens L1, the surfaces S3, S4 of the second lens L2 and the surfaces S10, S11 of the sixth lens L6 satisfy the following aspherical equation:

$$Z = \frac{cr^2}{1+\sqrt{1-(1+k)(c^2r^2)}} + Br^2 + Cr^4 + Dr^6 + Er^8 + Fr^{10} + Gr^{12} + Hr^{14}$$

In the above equation, Z is an offset amount (sag) in the optical axis 140 direction; r is the radius of curvature of a position close to the optical axis 140 (that is, the radius of curvature of the surfaces S1, S2, S3, S4, S10 and S11 in Table 1; k is a conic constant; c is an aspherical height (that is, the height from lens center to lens edge); B, C, D, E, F, G and H are aspherical coefficients. Further, other related parameters of the projection lens module 130 are shown in Table II.

TABLE II

|   | S1 | S2 | S3 | S4 | S10 | S11 |
|---|---|---|---|---|---|---|
| k | 0 | −0.58 | 0 | 0.63 | 0 | 0 |
| B | 0 | 0 | 0 | 0 | 0 | 0 |
| C | 1.7E−5 | −2.86E−4 | −7.74E−4 | −7.75E−4 | −7.54E−5 | 1.64E−4 |
| D | 1.77E−7 | −2.03E−6 | 1.45E−5 | 1.45E−5 | −6.1E−7 | −1.92E−6 |
| E | 3.55E−10 | 8.4E−8 | −8.14E−8 | −8.14E−8 | 3.16E−9 | 1.73E−8 |
| F | 1.07E−12 | −2.04E−9 | −1.37E−11 | −1.37E−11 | 7.05E−12 | −8.11E−11 |
| G | −3.9E−14 | 4.72E−11 | −5.19E−12 | −2.09E−11 | 0 | 0 |
| H | 9.07E−17 | −3.23E−13 | 5.41E−14 | 2.13E−13 | 0 | 0 |

In the embodiment, the distance between the sixth lens L6 and the light valve 122 is BFL; the effective focal length of the projection lens module 130 is f; and the total length of the projection lens module 130 is TT. In the embodiment, the projection lens module 130 satisfies the following equations: BFL/f>1.5 and 5.4<TT/f<13.5. Further, the distance between the third lens L3 and the fourth lens L4 is D34; and the distance between the sixth lens L6 and the prism 121 is D6P. In the embodiment, the projection lens module 130 satisfies the following equation: 3.5<D34/D6P<5.2.

In summary, the projection lens module 130 of the embodiment is constituted by two lens groups, in which the first lens L1, the second lens L2, the third lens L3, the fourth lens L4, the fifth lens L5 and the sixth lens L6 are sequentially disposed from the screen end 130a to the imaging end 130b and respectively have negative, negative, positive, negative, positive and positive refractive powers. Therefore, the projection lens module 130 has a wider angle and the throw ratio thereof may reach higher than 0.7. Furthermore, because of being equipped with the projection lens module 130, the projection display apparatus 100 of the invention is able to project a relatively-clear image with a size ranged from 7~500 inches. In other words, no matter the projection display apparatus 100 is used to project an image with large-size (e.g., 500 inches) or an image with small-size (e.g., 7 inches), the projected image is relatively clear and has a relatively high resolution.

Figure 3A:
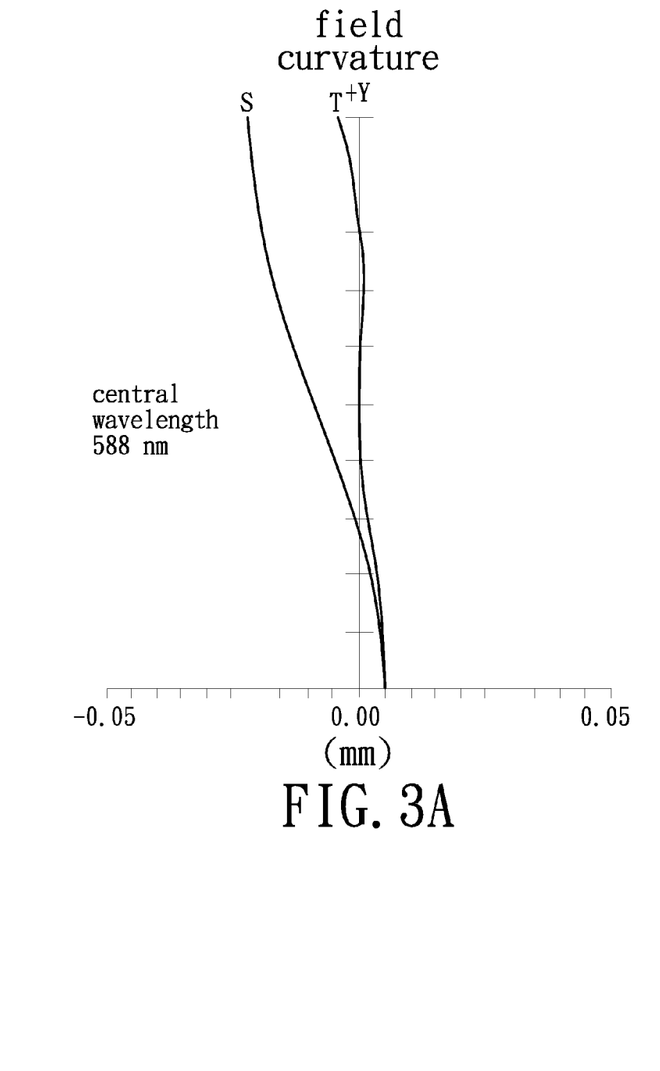
FIG. 3A is a plot of field curvature of a projection lens module in accordance with an embodiment of the invention.
Figure 3B:
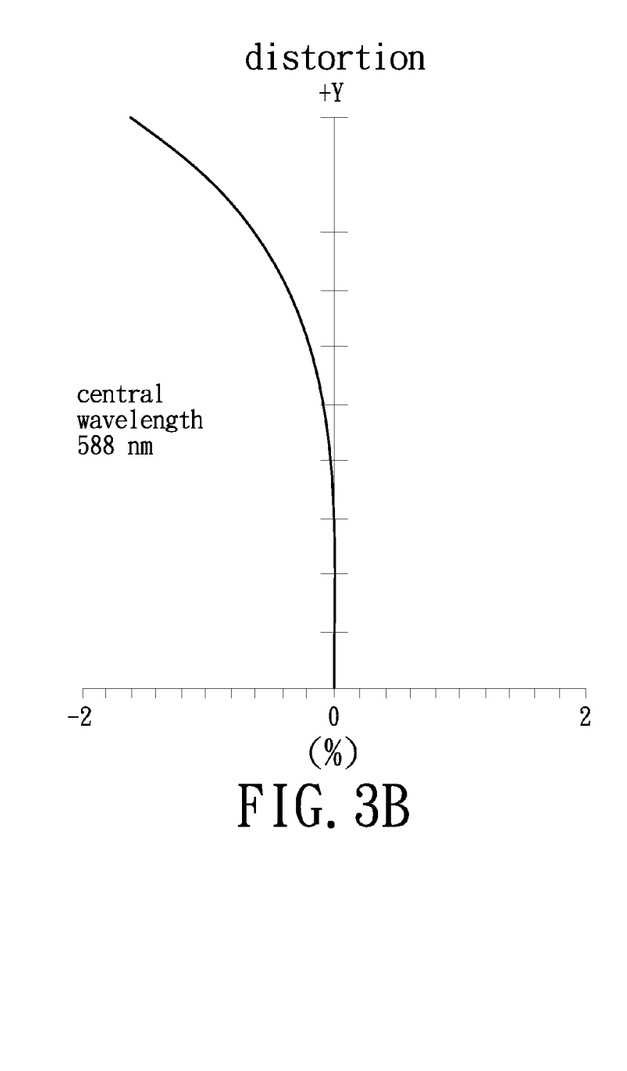
FIG. 3B is a plot of distortion of a projection lens module in accordance with an embodiment of the invention.
Figure 3C:
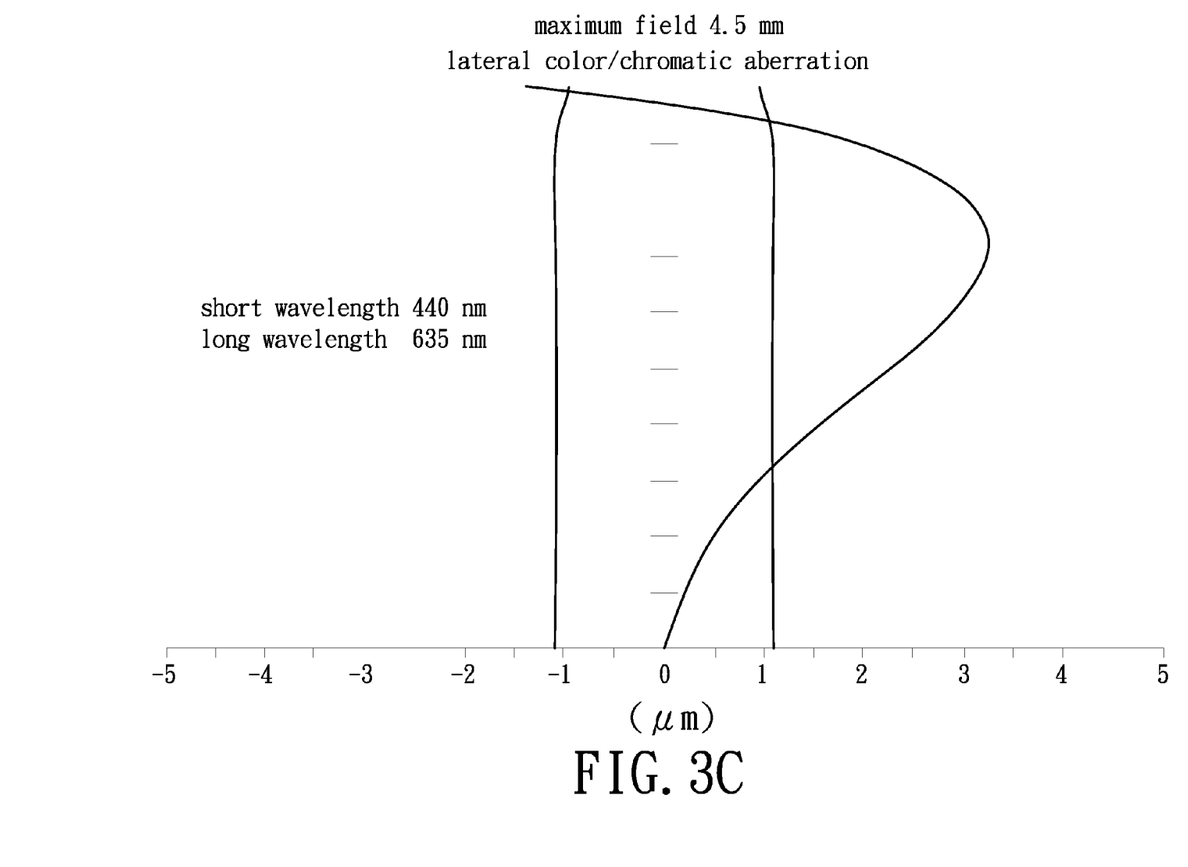
FIG. 3C is a plot of lateral color/chromatic aberration of a projection lens module in accordance with an embodiment of the invention.
Figure 3D:
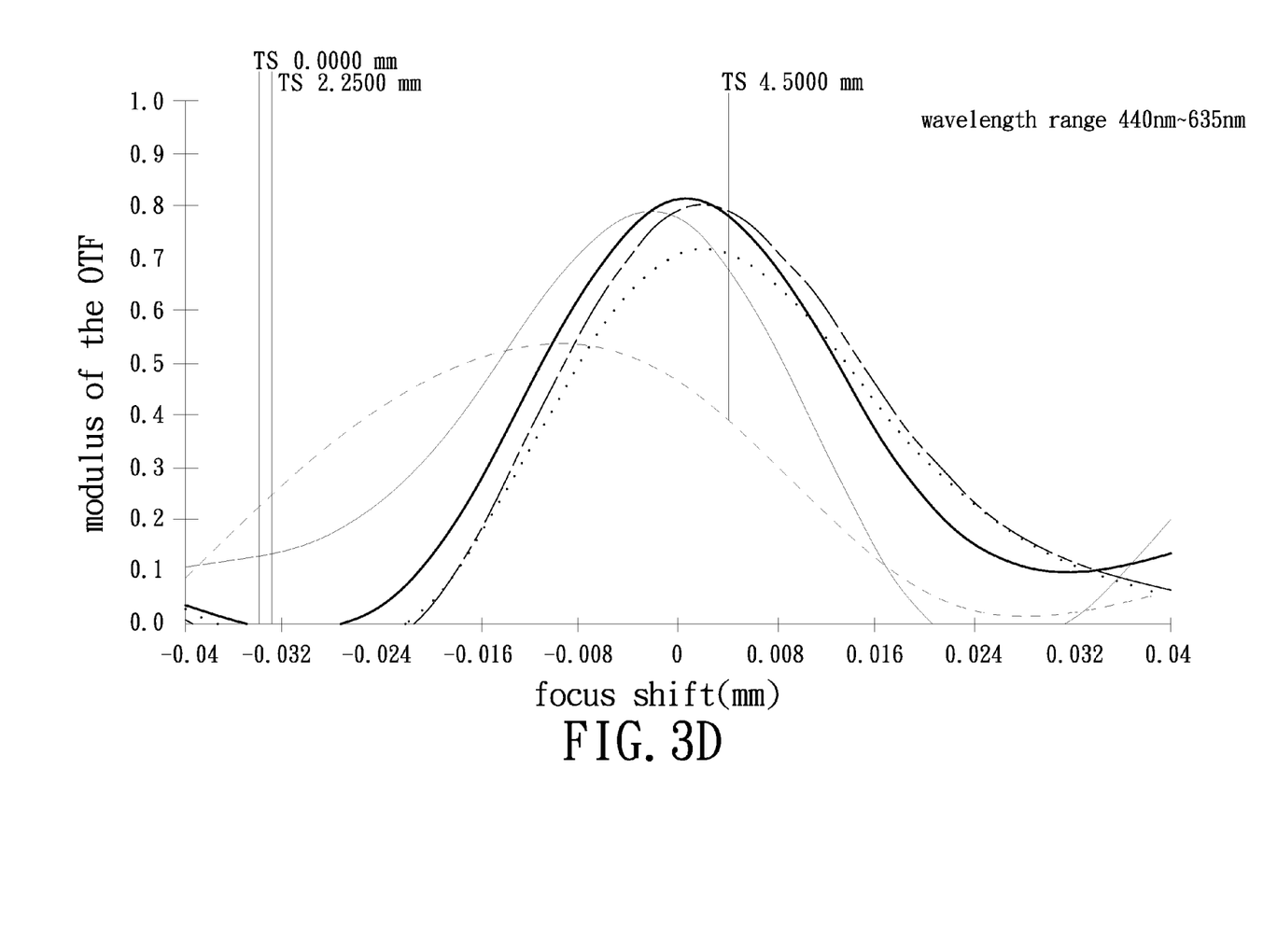
FIG. 3D is a plot of modulation transfer function (MTF) of a projection lens module in accordance with an embodiment of the invention.
Figure 3E:
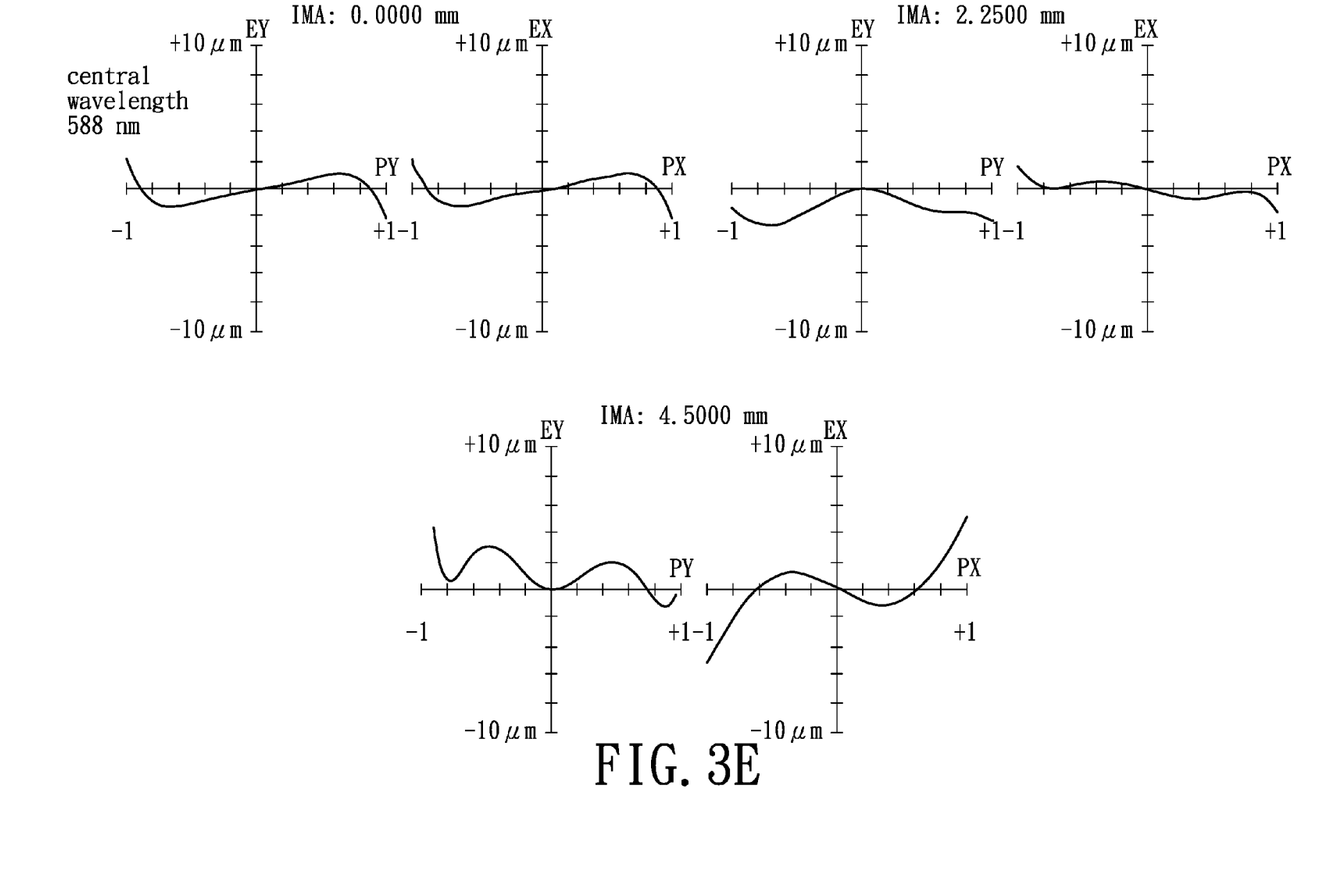
FIG. 3E is a plot of ray fan of a projection lens module in accordance with an embodiment of the invention.

FIG. 3A is a plot of field curvature of the projection lens module 130 in accordance with an embodiment of the invention. FIG. 3B is a plot of distortion of the projection lens module 130 in accordance with an embodiment of the invention. FIG. 3C is a plot of lateral color/chromatic aberration of the projection lens module 130 in accordance with an embodiment of the invention. FIG. 3D is a plot of modulation transfer function (MTF) of the projection lens module 130 in accordance with an embodiment of the invention; wherein the horizontal axis is focus shift and the vertical axis is modulus of the (optical transfer function) OTF. FIG. 3E is a plot of ray fan of the projection lens module 130 in accordance with an embodiment of the invention. As shown in plots 3A~3E, all the parameter values of the projection lens module 130 are within standard ranges; therefore, the projection lens module 130 of the invention has a good image quality.

Figure 4:
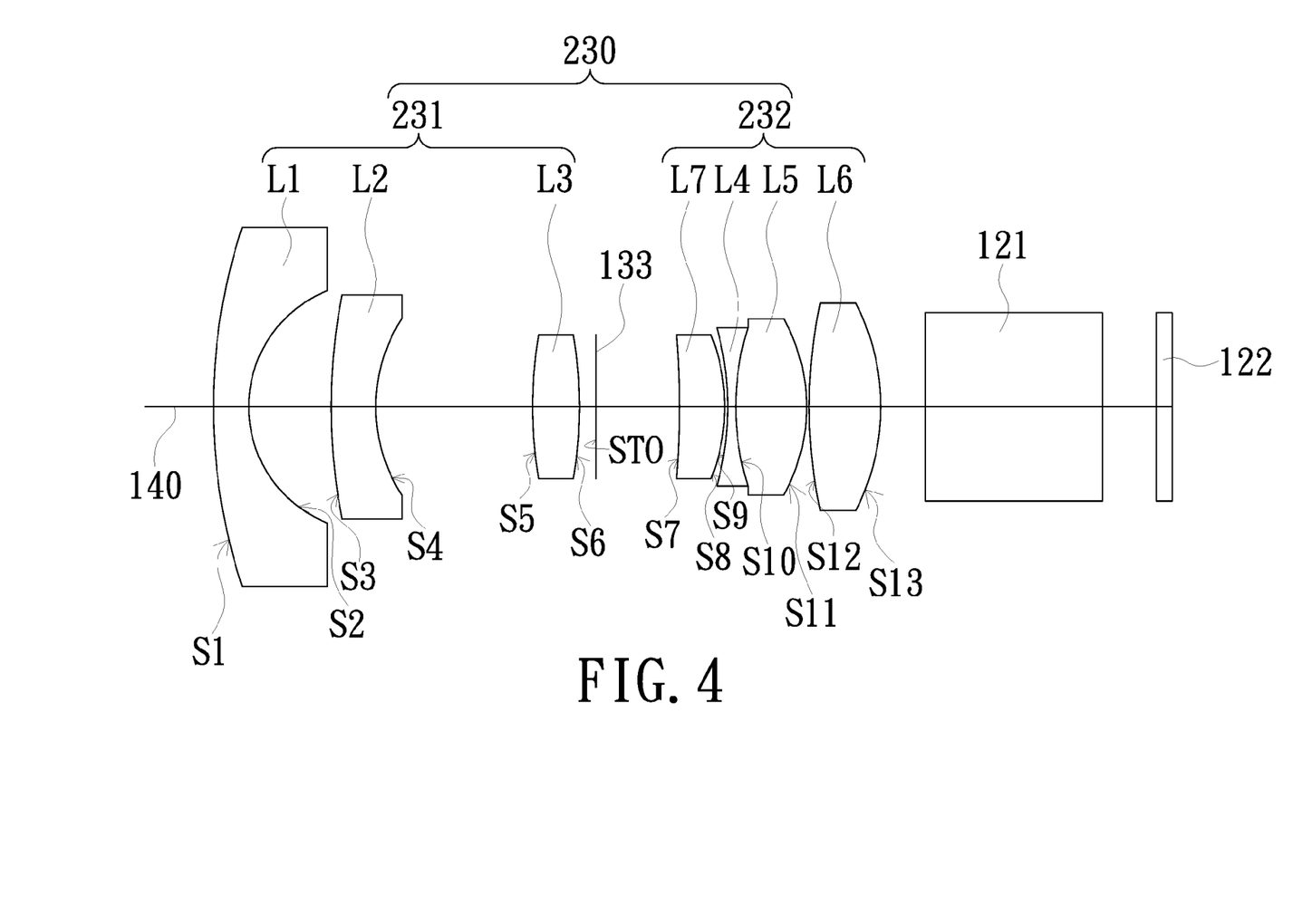
FIG. 4 is a schematic diagram of a projection lens module in accordance with another embodiment of the invention.

FIG. 4 is a schematic diagram of a projection lens module in accordance with another embodiment of the invention. As shown in FIG. 4, the projection lens module 230 of the embodiment has a structure similar to that of the projection lens module 130 of FIG. 2, thus, no any no redundant detail is to be given herein. Differences lie in that the first lens group 231 in the projection lens module 230 of the embodiment has a positive refractive power; the second lens group 232 further includes a seventh lens L7. The seventh lens L7 has a positive refractive power and is disposed between the third lens L3 and the fourth lens L4 and between the aperture stop 133 and the fourth lens L4.

In the projection lens module 230 of the embodiment as shown in FIG. 4, the first lens L1 is a convex-concave lens which has a convex surface facing the screen end; the second lens L2 is a convex-concave lens which has a convex surface facing the screen end; the third lens L3 is a convex-convex lens; the fourth lens L4 is a concave-concave lens; the fifth lens L5 is a convex-convex lens; the sixth lens L6 is a convex-convex lens; and the seventh lens L7 is a concave-convex lens which has a concave surface facing the screen end.

In the embodiment, the second lens group 232 includes at least one cemented lens. In the embodiment, the cemented lens is corporately formed by the fourth lens L4 and the fifth lens L5, but the invention is not limited thereto. In the embodiment, the projection lens module 230 is a fixed lens, but the invention is not limited thereto.

Please refer to Table III for the related parameters of the projection lens module 230 in accordance with an embodiment of the invention. It is to be noted that these parameters are merely examples, which should not unduly limit the scope of the claims. One of ordinary skill in the art would recognize many variations, alternatives, and modifications.

TABLE III

| Surface | Radius of Curvature (mm) | Distance (mm) | Refractive Index | Abbe number |
|---|---|---|---|---|
| S1 | 70.26 | 2.5 | 1.53 | 55.95 |
| S2 | 6.5 | 5.23 | | |
| S3 | 24.9 | 2.69 | 1.53 | 55.95 |
| S4 | 11.19 | 9.57 | | |
| S5 | 31.04 | 2.50 | 1.85 | 25.85 |
| S6 | −33.04 | 1.03 | | |
| STO | Infinity | 5.22 | | |
| S7 | −39.34 | 2.78 | 1.53 | 73.83 |
| S8 | −10.78 | 0.17 | | |
| S9 | −14.5 | 0.51 | 1.81 | 26.75 |
| S10 | 16.17 | 4.41 | 1.5 | 81.55 |
| S11 | −10.25 | 0.1 | | |
| S12 | 32.57 | 4.44 | 1.5 | 80.74 |
| S13 | −13.56 | 2.76 | | |

In Table III, surfaces S1, S2 are the two surfaces of the first lens L1; surface S3, S4 are the two surfaces of the second lens L2; surface S5, S6 are the two surfaces of the third lens L3; surface STO is the aperture stop; surface S7, S8 are the two surfaces of the seventh lens L7; the fourth lens L4 and the fifth lens L5 corporately form a cemented lens; surface S10 is a surface where the fourth lens L4 and the fifth lens L5 are cemented with each other, surface S9 is another surface of the fourth lens L4, and surface S11 is another surface of the fifth lens L5; and surface S12, S13 are the two surfaces of the sixth lens L6. The distance in Table III is referred to a linear distance between two adjacent surfaces on the optical axis 140. For example, the distance of surface S1 is referred to the linear distance between the surfaces S1, S2 of the first lens L1 on the optical axis 140, and so forth.

In the embodiment, the first lens group 231 includes at least one aspherical lens. For example, the first lens L1 and the second lens L2 are aspherical lenses and the third lens L3 is a spherical lens, but the invention is not limited thereto. In the embodiment, the second lens group 232 includes at least one aspherical lens. For example, the seventh lens L7 is an aspherical lens and the fourth lens L4, the fifth lens L5 and the sixth lens L6 are spherical lenses, but the invention is not limited thereto. In the projection lens module 230 of the embodiment, the shapes of the surfaces S1, S2 of the first lens L1, the surfaces S3, S4 of the second lens L2 and the surfaces S7, S8 of the seventh lens L7 satisfy the following aspherical equation:

$$Z = \frac{cr^2}{1+\sqrt{1-(1+k)(c^2r^2)}} + Br^2 + Cr^4 + Dr^6 + Er^8 + Fr^{10} + Gr^{12} + Hr^{14}$$

wherein please prefer to Table III for the radius of curvature in the above equation. Further, other related parameters of the projection lens module 230 are shown in Table IV.

TABLE IV

|   | S1 | S2 | S3 | S4 | S7 | S8 |
|---|---|---|---|---|---|---|
| k | −40 | −0.309 | 4.05 | 0.34 | −46.8 | 0.5 |
| B | 0 | 0 | 0 | 0 | 0 | 0 |
| C | 1.39E−4 | −2.2E−4 | −4.3E−4 | −1.8E−4 | −1.8E−4 | 3.7E−4 |
| D | −5.75E−7 | 4.74E−7 | 3.76E−6 | 2.24E−6 | 1.01E−5 | 1.11E−5 |
| E | 7.14E−10 | 4E−9 | 1.83E−8 | 5.82E−8 | −3.76E−7 | −6.79E−7 |
| F | 6.43E−12 | −9.64E−10 | −3.19E−10 | 3.66E−10 | 3.6E−9 | 3.25E−8 |
| G | −2.38E−14 | −1.66E−12 | −7.53E−13 | −4.97E−12 | 6.58E−10 | −6.18E−10 |
| H | −1.48E−17 | −3.11E−14 | 1.01E−13 | −3.44E−13 | −2.02E−11 | 2.24E−12 |

In the embodiment, the distance between the sixth lens L6 and the light valve 122 is BFL; the effective focal length of the projection lens module 230 is f; and the total length of the projection lens module 230 is TT. In the embodiment, the projection lens module 230 satisfies the following equations: BFL/f>1.5 and 5.4<TT/f<13.5. Further, the distance between the third lens L3 and the seventh lens L7 is D37; and the distance between the sixth lens L6 and the prism 121 is D6P. In the embodiment, the projection lens module 230 satisfies the following equation: 3.5<D34/D6P<5.2.

Figure 5A:
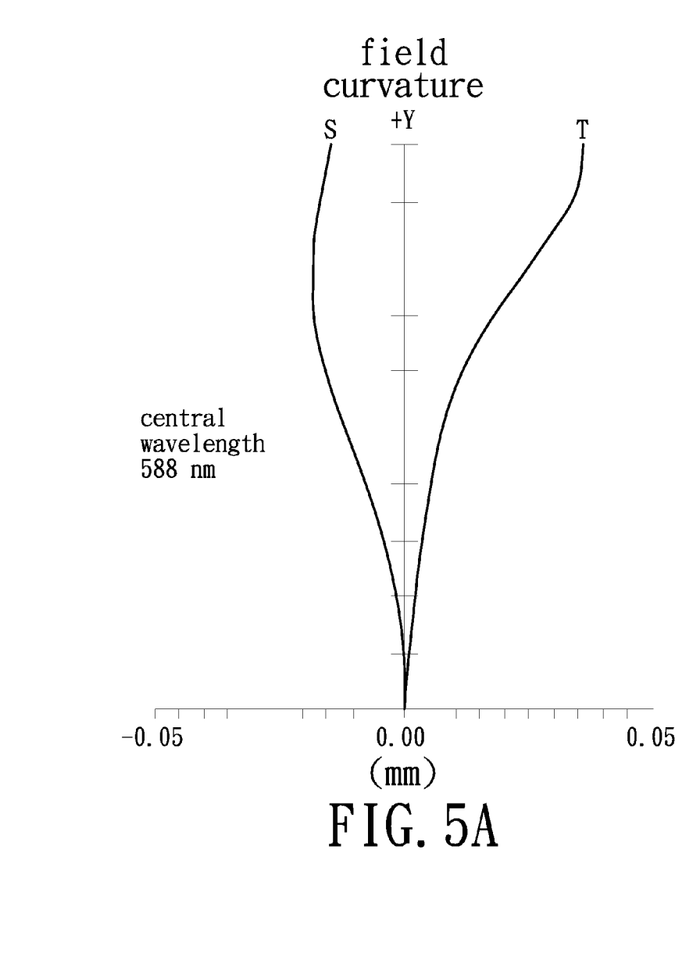
FIG. 5A is a plot of field curvature of a projection lens module in accordance with another embodiment of the invention.
Figure 5B:
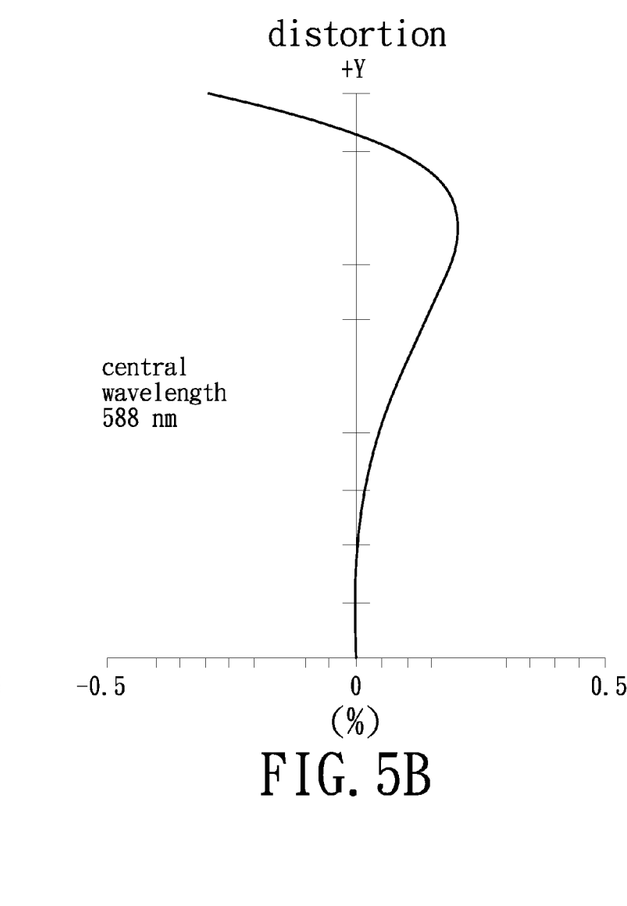
FIG. 5B is a plot of distortion of a projection lens module in accordance with another embodiment of the invention.
Figure 5C:
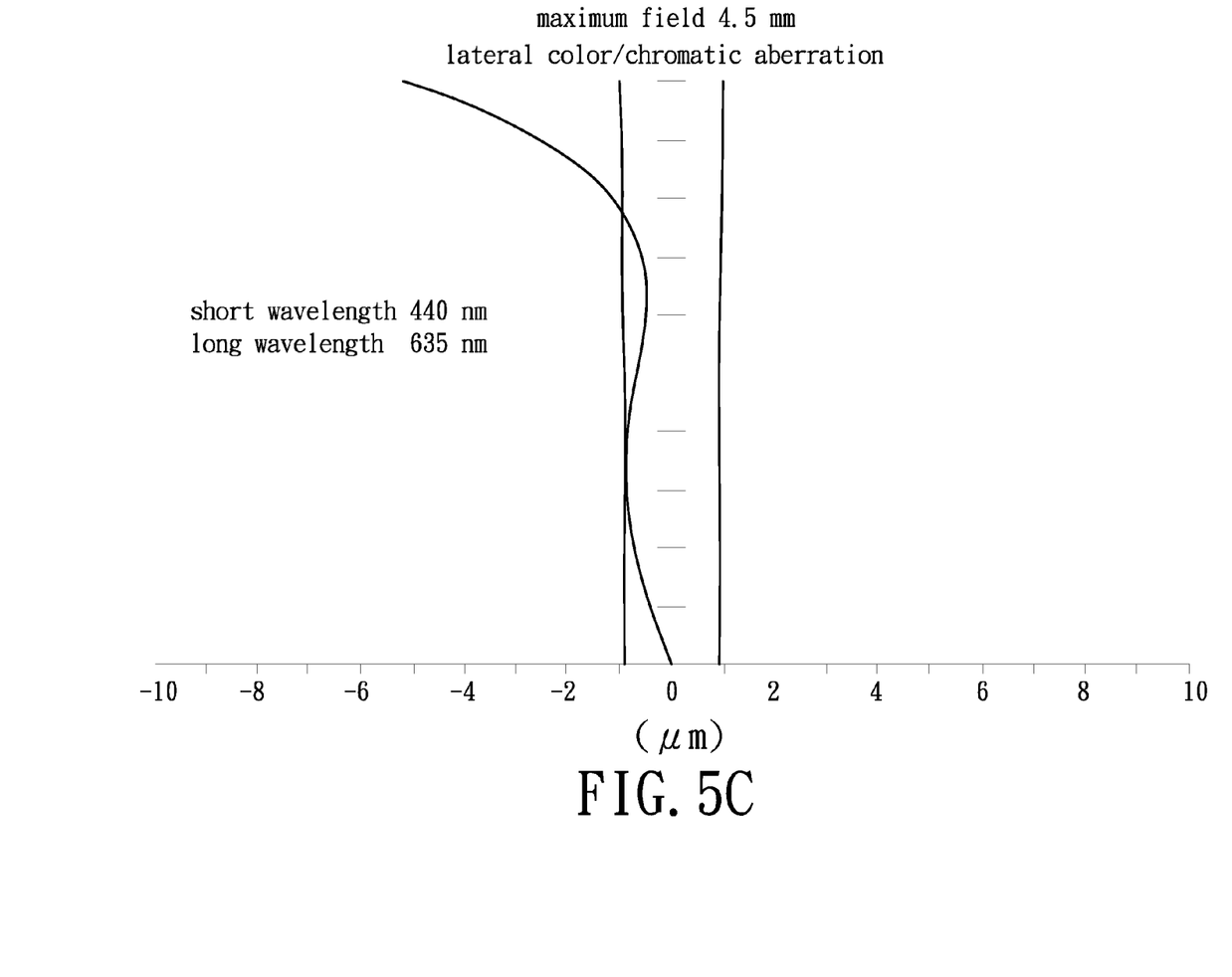
FIG. 5C is a plot of lateral color/chromatic aberration of a projection lens module in accordance with another embodiment of the invention.
Figure 5D:
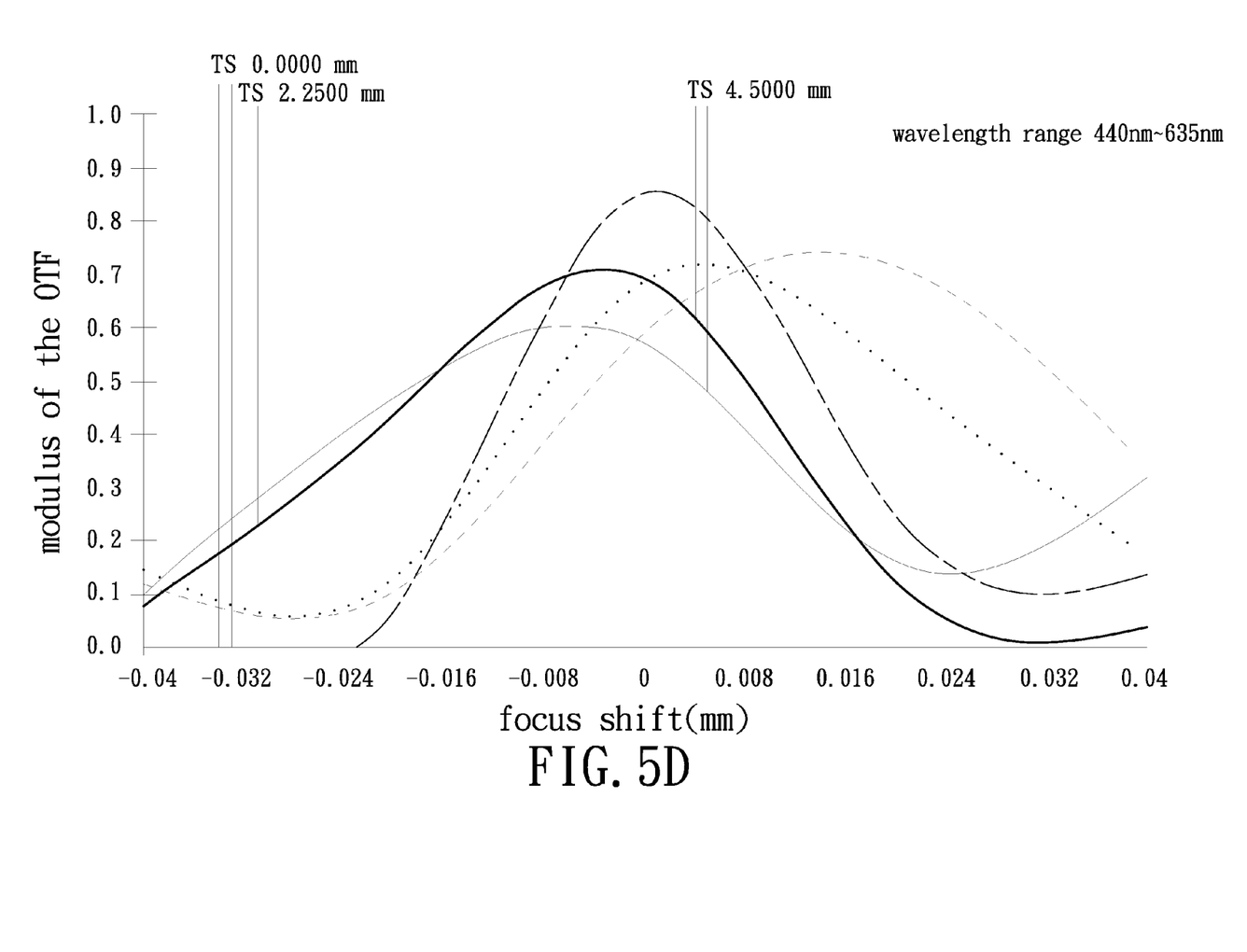
FIG. 5D is a plot of modulation transfer function (MTF) of a projection lens module in accordance with another embodiment of the invention.
Figure 5E:
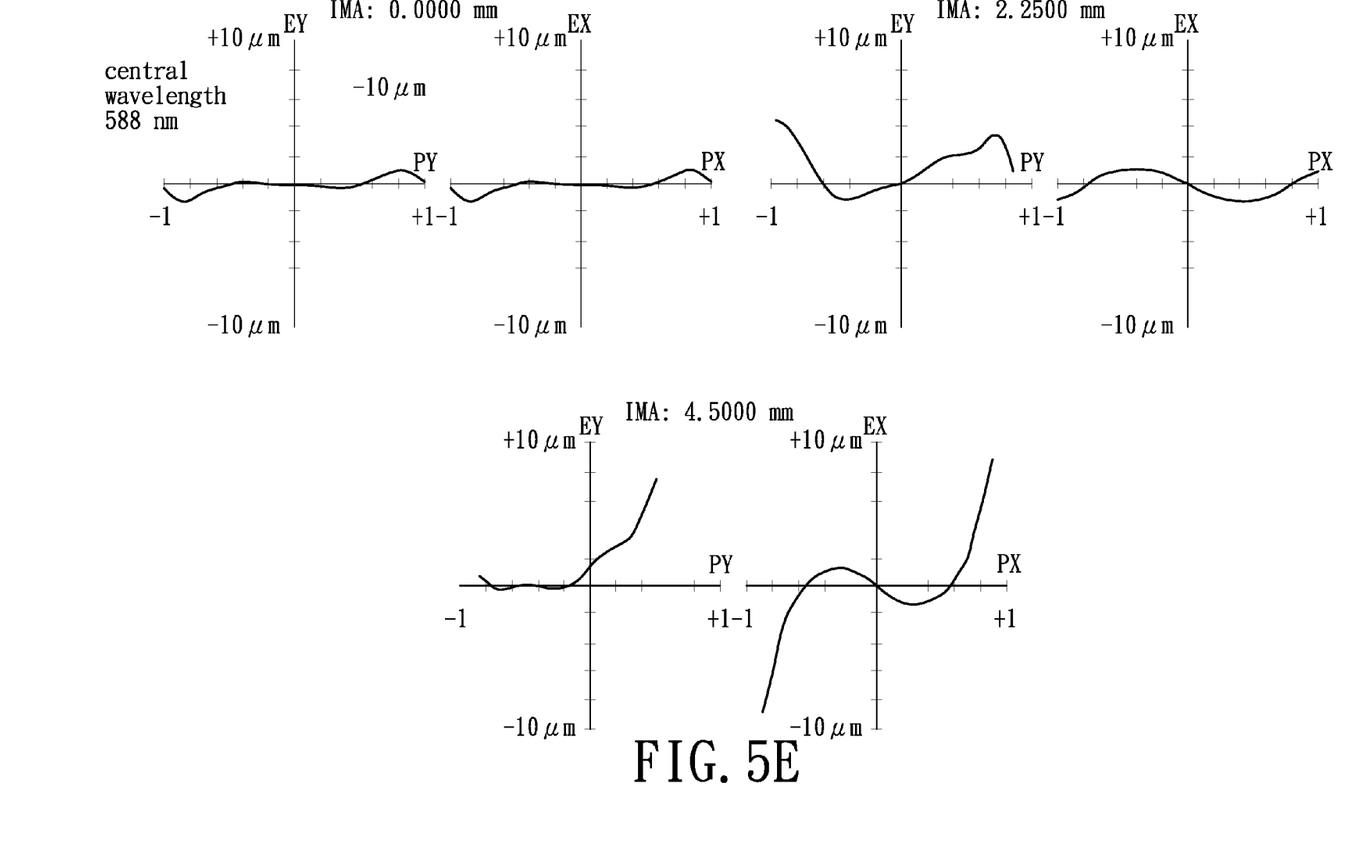
FIG. 5E is a plot of ray fan of a projection lens module in accordance with another embodiment of the invention.

FIG. 5A is a plot of field curvature of the projection lens module 230 in accordance with an embodiment of the invention. FIG. 5B is a plot of distortion of the projection lens module 230 in accordance with an embodiment of the invention. FIG. 5C is a plot of lateral color/chromatic aberration of the projection lens module 230 in accordance with an embodiment of the invention. FIG. 5D is a plot of modulation transfer function (MTF) of the projection lens module 230 in accordance with an embodiment of the invention. FIG. 5E is a plot of ray fan of the projection lens module 230 in accordance with an embodiment of the invention. As shown in plots 5A~5E, all the parameter values of the projection lens module 230 are within standard ranges; therefore, the projection lens module 230 of the invention has a good image quality.

In summary, the projection lens module of the invention is constituted by two lens groups, in which the first lens, the second lens, the third lens, the fourth lens, the fifth lens and the sixth lens are sequentially disposed from a screen end to an imaging end and respectively have negative, negative, positive, negative, positive and positive refractive powers. Therefore, the projection lens module of the invention has a wider angle. Because the distance between the between the first lens group and an aperture stop and/or the distance between the second lens group and the imaging end is adjustable when the projection lens module zooms, the images regardless with large-size or with small-size in the invention are relatively clear and have relatively high resolutions in response to various projection requirements. Since the projection display apparatus and the projection lens module have improved imaging qualities, the projected images with various sizes in the invention are relatively clear and have relatively high resolutions in response to various environmental requirements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection display apparatus, comprising:
    a light source module, configured to provide a light beam;
    an optical engine module, disposed on a transmission path of the light beam, the optical engine module comprising:
        a prism; and
        a light valve, configured to convert the light beam emitted from the prism into an image beam; and
    a projection lens module, disposed between a screen end and an imaging end and disposed on a transmission path of the image beam, the projection lens module comprising:
    a first lens group, disposed between the screen end and the imaging end, the first lens group comprising a first lens, a second lens and a third lens sequentially disposed from the screen end to the imaging end and having negative, negative and positive refractive powers, respectively; and
    a second lens group, disposed between the first lens group and the imaging end and having a positive refractive power, the second lens group comprising a fourth lens, a fifth lens and a sixth lens sequentially disposed from the screen end to the imaging end and having negative, positive and positive refractive powers, respectively.

2. The projection display apparatus according to claim 1, wherein the projection lens module further comprises:
    an aperture stop, disposed between the first lens group and the second lens group,
    wherein the sixth lens is disposed close to the imaging end,
    wherein at least one of a first distance and a second distance is adjustable,
    wherein the first distance is the distance between the first lens group and the aperture stop,
    and the second distance is the distance between the second lens group and the imaging end.

3. The projection display apparatus according to claim 1, wherein the fourth lens and the fifth lens form a cemented lens.

4. The projection display apparatus according to claim 1, wherein the first lens and the second lens are aspherical lenses, wherein the third lens, the fourth lens and the fifth lens are spherical lenses.

5. The projection display apparatus according to claim 1, wherein a distance between the sixth lens and the light valve is BFL, an effective focal length of the projection lens module is f, and the following equation is satisfied: $BFL/f > 1.5$.

6. The projection display apparatus according to claim 1, wherein a total length of the projection lens module is TT, an effective focal length of the projection lens module is f, and the following equation is satisfied: $5.4 < TT/f < 13.5$.

7. The projection display apparatus according to claim 1, wherein a distance between the third lens and the fourth lens is D34, a distance between the sixth lens and the prism is D6P, and the following equation is satisfied: $3.5 < D34/D6P < 5.2$, wherein the prism is disposed between the sixth lens and the light valve.

8. The projection display apparatus according to claim 1, wherein the first lens group has a negative refractive power.

9. The projection display apparatus according to claim 1, wherein the second lens group further comprises:
    a seventh lens, disposed between the third lens and the fourth lens and having a positive refractive power, wherein the first lens group has a positive refractive power.

10. The projection display apparatus according to claim 9, wherein a distance between the third lens and the seventh lens is D37, a distance between the sixth lens and the prism is D6P, and the following equation is satisfied: $2 < D37/D6P < 5.2$, wherein the prism is disposed between the sixth lens and the light valve.

11. A projection lens module, disposed between a screen end and an imaging end and disposed on a transmission path of an image beam from a light valve, the projection lens module comprising:
    a first lens group, disposed between the screen end and the imaging end, the first lens group comprising a first lens, a second lens and a third lens sequentially disposed from the screen end to the imaging end and having negative, negative and positive refractive powers, respectively; and
    a second lens group, disposed between the first lens group and the imaging end and having a positive refractive power, the second lens group comprising a fourth lens, a fifth lens and a sixth lens sequentially disposed from the screen end to the imaging end and having negative, positive and positive refractive powers, respectively.

12. The projection lens module according to claim 11, further comprising:
    an aperture stop, disposed between the first lens group and the second lens group,
    wherein the sixth lens is disposed close to the imaging end,
    wherein at least one of a first distance and a second distance is adjustable,
    the first distance: the distance between the first lens group and the aperture stop,
    the second distance: the distance between the second lens group and the imaging end.

13. The projection lens module according to claim 11, wherein the fourth lens and the fifth lens form a cemented lens.

14. The projection lens module according to claim 11, wherein the first lens and the second lens are aspherical lenses, wherein the third lens, the fourth lens and the fifth lens are spherical lenses.

15. The projection lens module according to claim 11, wherein a distance between the sixth lens and the light valve is BFL, an effective focal length of the projection lens module is f, and the following equation is satisfied: $BFL/f > 1.5$.

16. The projection lens module according to claim 11, wherein a total length of the projection lens module is TT, an effective focal length of the projection lens module is f, and the following equation is satisfied: $5.4 < TT/f < 13.5$.

17. The projection lens module according to claim 11, wherein a distance between the third lens and the fourth lens is D34, a distance between the sixth lens and a prism is D6P, and the following equation is satisfied: $3.5<D34/D6P<5.2$, wherein the prism is disposed between the sixth lens and the light valve.

18. The projection lens module according to claim 11, wherein the first lens group has a negative refractive power.

19. The projection lens module according to claim 11, wherein the second lens group further comprises:
   a seventh lens, disposed between the third lens and the fourth lens and having a positive refractive power, wherein the first lens group has a positive refractive power.

20. The projection lens module according to claim 19, wherein a distance between the third lens and the seventh lens is D37, a distance between the sixth lens and a prism is D6P, and the following equation is satisfied: $2<D37/D6P<5.2$, wherein the prism is disposed between the sixth lens and the light valve.

* * * * *